United States Patent [19]
Kato

[11] 3,742,760
[45] July 3, 1973

[54] LOAD TRANSDUCER
[75] Inventor: Yoshimi Kato, Kariya, Japan
[73] Assignee: Toyoda Koki Kabushiki Kaisha, Kariya-shi, Aichi-ken, Japan
[22] Filed: Aug. 1, 1972
[21] Appl. No.: 276,933

[30] Foreign Application Priority Data
   Aug. 1, 1971   Japan.............................. 46/57629

[52] U.S. Cl. ................................ 73/141 A, 73/94
[51] Int. Cl. ........................................... G01l 1/22
[58] Field of Search............ 73/141 A, 94, 398 AR

[56] References Cited
   UNITED STATES PATENTS
   2,466,034   4/1949   Mathews...................... 73/141 A X
   3,298,233   1/1967   Chelner et al. .................. 73/398 A
   3,389,432   6/1968   Griesheimer et al....... 73/141 A UX
   3,621,927   11/1971   Ormond........................ 73/141 A X Primary Examiner—Charles A. Ruehl
Attorney—Norman F. Oblon et al.

[57] ABSTRACT

A load transducer comprises a strain column having an axial bore therein and a pair of strain gauges, one of which is fastened on one end of the strain column across the open axial bore and the other of which is bonded on the inner cylindrical surface of the bore being disposed in the axial direction therein. The strain gauges are fabricated into an electrical bridge circuit together with other electrical resistance means. Upon application of an axial load to the strain column, the strain gauges are strained in accordance with Poisson's ratio, whereby the axial load is measured with high accuracy and high sensitivity.

9 Claims, 4 Drawing Figures

PATENTED JUL 3 1973    3,742,760

LOAD TRANSDUCER

BACKGROUND OF THE INVENTION

1. Field of the Invention

The present invention relates generally to load transducers and more particularly to an improved load transducer for changing the load or pressure applied thereto into an electric output.

2. Description of the Prior Art

In general, a load transducer is provided with a flexible member which may be deformed by a load to be measured and has strain gauges of wire or semiconductor material secured on the surface of the flexible member. In one conventional form of load transducers, a metallic cylindrical member is used as the flexible member to which the load being measured is axially transmitted, and the strain gauges are fastened on either the inner or the outer surface of the cylindrical member. On this surface, three kinds of stresses, namely compressive, tensile and shearing stress, are produced according to the compressive or tensile load applied to the cylindrical member. Therefore, when the strain gauge is fastened on the cylindrical surface, the direction of orientation thereof and the portion of the cylindrical surface where the strain gauge is fastened must be carefully selected, taking stress distribution on the cylindrical surface into consideration so as to measure the load with the highest accuracy.

But, for example, when bending momentum caused by an inclined load or the like acts on the cylindrical member, undesirable compressive or tensile stresses are inevitably produced on the cylindrical surface. Accordingly, it is difficult in such conventional load transducers to maintain the linear relationship between the changes in the electrical resistance of the strain gauges and the load applied throughout a wide range of loads.

Furthermore, in this prior art, if strain gauges of semi-conductor materials are used for obtaining an extremely small-size load transducer, it is difficult to accurately bond the strain gauges at predetermined positions on the inner or outer cylindrical surface of the cylindrical member. This contributes to the lowering of the measuring accuracy and makes it difficult to produce load transducers having uniform sensitivity, that is, uniform input-output characteristics.

In addition, in metal compacting technology, it has been considered difficult to measure the compacting pressure with high accuracy and to produce such a load transducer capable of solving the above-mentioned problem, because the compressive stress generated in such metal compacting parts is very large and varies over a wide range, and the compacting parts are to be produced without unevenness, and because when the compacting parts are designed to be very small, the load transducer must also be of corresponding small size.

SUMMARY OF THE INVENTION

Accordingly, it is an object of the present invention to provide a load transducer for measuring load with high accuracy through a wide variation range of load.

Another object of the present invention is the provision of a load transducer for measuring load with high accuracy which avoids the influence of bending momentum due to inclination of the load.

A further object of the present invention is to provide a load transducer of uniform input-output characteristics.

Still another object of the present invention is to provide a load transducer which is of especially small size, yet which offers high accuracy and is easy to produce.

A still further object of the present invention is to provide a load transducer for accurately measuring high pressure as a small load of predetermined scale.

Yet still a further object of the present invention is to provide a load transducer for measuring the density of a metal compacting part as compressive stress generated in the compacting part during its compression process.

The foregoing and other objects are obtained in accordance with one aspect of the present invention through the provision of a load transducer comprising a housing, a strain column mounted on the housing at one end thereof and provided with an axial hollow therein, first strain gauge means radially secured on the other axial end portion of the strain column across the axial hollow, a load receiving cap mounted on the other end of the strain column for axially transmitting a load to the strain column, and an electrical bridge circuit in which the strain gauge means is connected as a component of electrical resistance.

BRIEF DESCRIPTION OF THE DRAWINGS

Various other objects, features and attendant advantages of the present invention will be more fully appreciated as the same becomes better understood from the following detailed description of a preferred embodiment of the present invention when considered in connection with the accompanying drawings in which.

DETAILED DESCRIPTION OF A PREFERRED EMBODIMENT

Figure 1:
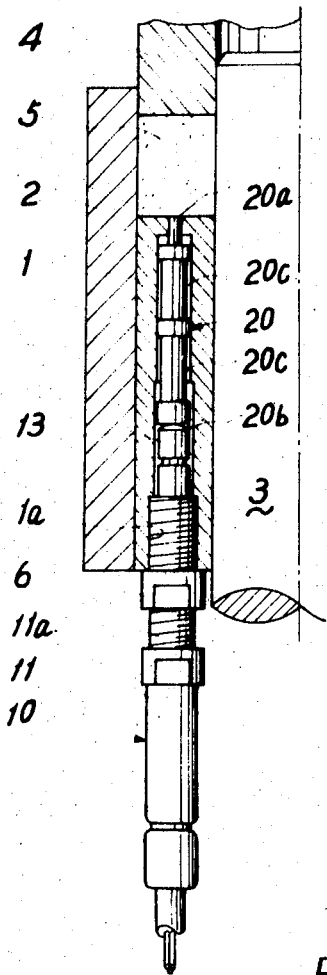
FIG. 1 is a front elevation view of a load transducer constructed according to this invention which is attached to a powder compacting press partly shown in section.

Referring now to the drawings, wherein like reference numerals designate identical or corresponding parts throughout the several views, and more particularly to FIG. 1 thereof, a load transducer 10 is shown being mounted in a powder compacting press which has a lower punch 1, an outer platen 2, a core rod 3, and an upper punch 4. Metal powder is supplied in an annular cavity formed by the lower punch 1, the outer platen 2 and the core rod 3 and is compressed by the upper punch 4 to shape a compacted part 5.

In this metal compacting process, it is necessary to measure the compressive pressure generated in the metal powder for obtaining compacted parts of equal quality.

The compacting pressure is detected by the load transducer 10 which is secured to the lower punch 1 by means of an internally threaded portion 1a formed in the lower end of the lower punch 1 and cooperating outer threads 11a formed on the upper portion of a housing 11 of the load transducer 10. Moreover, a lock nut 6 is engaged on the outer threads 11a of the housing 11 and serves to secure the load transducer 10 at an appropriate axial position with respect to the lower punch 1.

Figure 2:
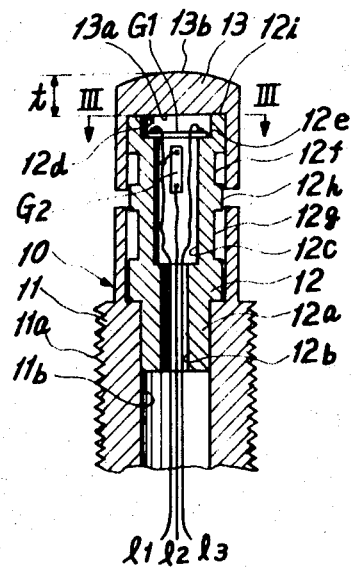
FIG. 2 is an enlarged section view of the main portion of the load transducer shown in FIG. 1.
Figure 3:
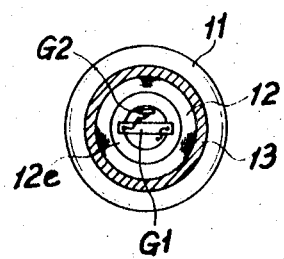
FIG. 3 is a cross-section view taken along the line III—III in FIG. 2.

This load transducer 10, as shown in FIG. 2, comprises the housing 11, a strain column 12, a load receiving cap 13 and strain gauges G1 and G2 of semiconductor material. The housing 11 has an axial hollow 11b in which the lower end portion 12a of the strain column 12 is securedly fitted. The strain column 12 has co-axially stepped hollows or bores 12b, 12c, and 12d which are respectively of increased diameter from the lower end to the upper end thereof, such that a shoulder portion 12e is formed between the central bore or hollow 12c and the upper bore or hollow 12d. The strain gauge G1 of semi-conductor material is radially secured on the shoulder portion 12e extending across the axial bore 12c. A first annular recess 12f is formed on the outer cylindrical surface of the strain column 12 for obtaining a greater strain thereat. The strain gauge G2 of semi-conductor material is bonded axially on the inner surface of the strain column 12 defined by the bore portion 12c at a position axially corresponding to the first annular recess 12f. A second annular recess 12g is formed on the outer cylindrical surface of the strain column 12 at a position between the lower end portion 12a thereof and the first annular recess 12f for preventing undesirable compressive or tensile strain on the inner and outer cylindrical surface in the upper portion of the strain column 12 as might be caused by bending moment. The bending moment which acts on the strain column 12 is mainly caused by the inclination of a load and such direction of application of the load since the strain column 12 is a sort of cantilever. In this configuration, the bending moment is mostly absorbed by the second annular recess 12g, and the influence of the bending moment on the strain gauge G2 therefore becomes negligibly small. In addition, a land or enlarged portion 12h formed between the first and second recesses 12f and 12g prevents undesirable deformation, such as buckling, of the strain column 12.

On the top of the strain column 12, the load receiving cap 13 is mounted with the underside surface 13a thereof snugly contacting the upper annular end surface 12i of the strain column 12 and the upper surface 13b thereof being formed as a part of a sphere of a small curvature. The load to be measured is axially applied at the center of the upper surface 13b. Moreover, the load receiving cap 13 is formed with sufficient thickness t to prevent distortion thereof and to positively transmit the load to the strain column 12.

Figure 4:
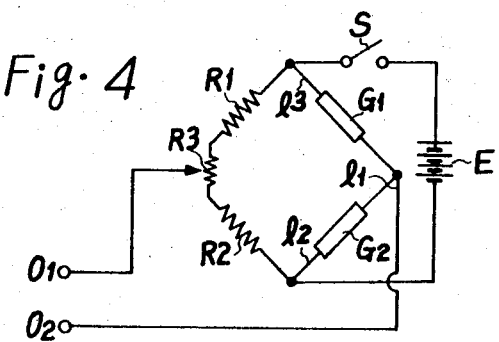
FIG. 4 is a schematic view of an electrical bridge circuit for manifesting the load as an electrical output.

The strain gauges G1 and G2 are connected to lead wires l1, l2 and l3, and are fabricated into an electrical bridge circuit together with fixed electrical resistance components R1 and R2 and a variable resistance component R3, as shown in FIG. 4. A constant voltage input of direct current is supplied from an electrical source E to this bridge circuit by closing a normally open contact S, and the output voltage which is changed according to any variation of resistance of the strain gauges G1 and G2 is picked up between terminals of O1 and O2. The electrical resistances of the strain gauges G1 and G2 are proportionally varied in accordance with the variation of the load applied thereto. In this bridge circuit, the variable electrical resistance component R3 is adopted for adjusting the initial output voltage to zero.

When the strain column 12 is compressed by a load transmitted through the load receiving cap 13, the radially oriented strain gauge G1 receives tensile strain corresponding to radial strain of the strain column 12, according to Poissons's Ratio. On the other hand, the axially oriented strain gauge G2 is compressed by axial strain being proportional to the load. Therefore, the output voltage of the bridge circuit is doubled compared with the case where only one strain gauge is employed.

Furthermore, in the present invention, as the strain gauge G2 receives a large compressive strain because of the thinness or the stress concentration at the first annular recess 12f and is not influenced by the bending moment acting upon the strain column 12, owing to the second annular recess 12g, a measurement can be achieved which is highly accurate and very sensitive.

For measuring the pressure generated in compacting metal powder, a load transmitting bar 20 is adopted. The load transmitting bar 20 is mounted in the lower punch 1 and is axially slidable therein. The upper end surface 20a of this bar 20 is exposed to the metal powder and the lower end surface 20b thereof is engaged with the center of the upper surface 13b of the load receiving cap 13. The diameter of the upper end surface 20a is selected to be a predetermined small size for sensing large pressure in the metal powder as a small load of desirable scale. Moreover, on the outer cylindrical surface of the load transmitting bar 20, upper and lower annular recesses 20c, 20c are provided for reducing the frictional force between the interior surface of the lower punch 1 and the outer surface of the transmitting bar 20, and for correctly transmitting the axial load to the load transducers 10.

Obviously many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States to be secured by Letters patent of the United states is:

1. A load transducer comprising:
    a housing;
    a strain column mounted on said housing at one end thereof and having an axial hollow therein;
    first strain gauge means radially secured on the other end of said strain column across said axial hollow; and strain
    load receiving means mounted on said other end of said strin column for axially transmitting load to said strain column.

2. A load transducer according to claim 1, further comprising second strain gauge means axially fixed on the cylindrical surface of said axial hollow in said strain column, said first and second strain gauge means being connected in a bridge circuit.

3. A load transducer according to claim 2, wherein said strain column is provided with a first annular recess formed at a position thereon axially corresponding to the place where said second strain gauge means is fixed.

4. A load transducer according to claim 3, wherein said strain column is provided with a second annular recess formed between said first annular recess and said one end of said strain column.

5. A load transducer according to claim 4, further comprising a load transmitting means having a pressure receiving surface of predetermined area at one end thereof for receiving pressure as a load from a pressure applying zone, and being in contact with said load receiving means at the other end thereof for axially transmitting the load to said load receiving means.

6. A load transducer according to claim 1, further comprising a load transmitting means having a pressure receiving surface of predetermined area at one end thereof for receiving pressure as a load from a pressure applying zone, and being in contact with said load receiving means at the other end thereof for axially transmitting the load to said load receiving means.

7. A load transducer comprising:
   a housing;
   a strain column mounted on said housing at one end thereof and having an axial hollow therein;
   first strain gauge means provided across said axial hollow on the other end of said strain column with one end of said first strain gauge means being fixed on the said other end of said strain column and the other end of said first strain gauge means being fixed on the diametrically opposite portion of said other end of said strain column;
   load receiving means mounted on said other end of said strain column for axially transmitting load to said strain column; and
   second strain gauge means axially fixed on the cylindrical surface of said axial hollow in said strain column, said first and said second strain gauge means being connected in a bridge circuit.

8. A load transducer for measuring compacting pressure in a powder compacting press, comprising:
   a housing securedly mounted in a punch means of said powder compacting press;
   a strain column mounted on said housing at one end thereof, said strain column having an axial hollow extending therethrough;
   strain gauge means radially secured on the other end of said strain column across said axial hollow;
   load receiving means mounted on said other end of said strain column; and
   load transmitting means slidably mounted in said punch means, said load transmitting means having a pressure receiving surface exposed to a pressure applying zone at one end thereof for receiving compacting pressure as a load, and another end of said load transmitting means being in contact with said load receiving means for axially transmitting the load to said load receiving means.

9. A load transducer according to claim 8, further comprising:
   strain gauge means axially bonded on the cylindrical surface of said axial hollow in said strain column; and
   bridge circuit means having said radial strain gauge means and said axial strain gauge means connected in adjacent arms thereof.

* * * * *